United States Patent [19]
Kobayashi

[11] Patent Number: 5,619,285
[45] Date of Patent: Apr. 8, 1997

[54] CRT DRIVE CIRCUIT

[75] Inventor: Masaki Kobayashi, Nagasaki, Japan

[73] Assignee: Mitsubishi Denki Kabushiki Kaisha, Chiyoda-ku, Japan

[21] Appl. No.: 454,860

[22] Filed: May 31, 1995

[30] Foreign Application Priority Data

Jul. 13, 1994 [JP] Japan ................................. 6-161394

[51] Int. Cl.⁶ .............................. H04N 3/22; H04N 3/26
[52] U.S. Cl. ...................................... 348/806; 315/382.1
[58] Field of Search ............................. 348/805, 806, 348/705, 706, 687, 377, 379, 380, 745, 746, 607; 315/382.1, 375, 14; H04N 5/57, 9/73, 5/16, 3/22, 3/26

[56] References Cited

U.S. PATENT DOCUMENTS 4,165,506  8/1979  Brands et al. ........................ 340/706
4,600,945  7/1986  Bolger .................................. 348/806

FOREIGN PATENT DOCUMENTS 60-12873    1/1985  Japan .
5-14835     1/1993  Japan .
405236386A  9/1993  Japan ............................ H04N 5/57

*Primary Examiner*—Michael Lee
*Attorney, Agent, or Firm*—Burns, Doane, Swecker & Mathis, LLP

[57] ABSTRACT

A CRT drive circuit of the present invention comprises a screen voltage control section 10 for adjusting screen voltage output from a screen voltage generating circuit 4 to a focus preference value or raster moire improvement preference value in order to enable a user to select screen voltages, so that the CRT drive circuit is capable of giving preference to the improvement of raster moire or focus depending on the indication of a display screen.

8 Claims, 9 Drawing Sheets

CRT DRIVE CIRCUIT

BACKGROUND OF THE INVENTION

(1) Field of the Invention

The present invention relates to a CRT drive circuit for driving a cathode ray tube (CRT).

(2) Description of the Prior Art

Figure 9:
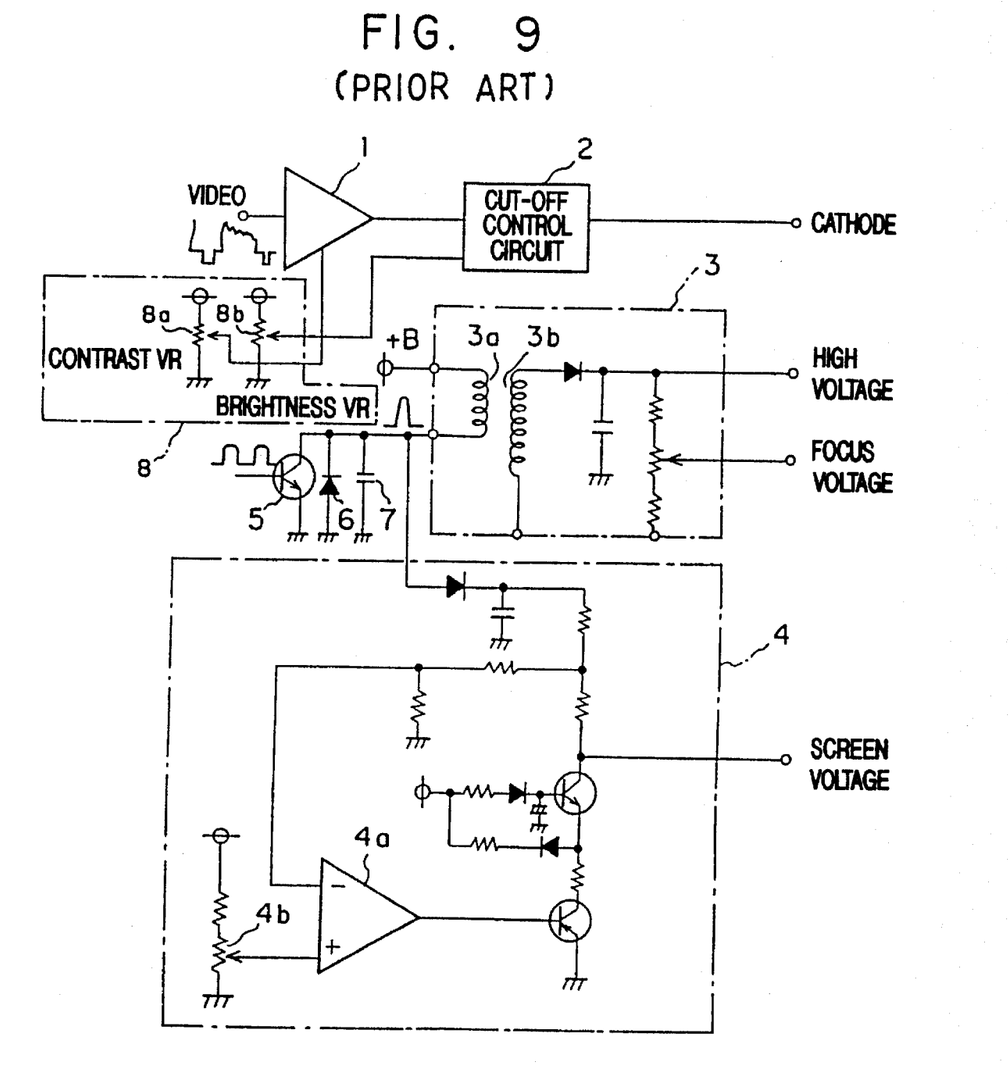
FIG. 9 is a circuit diagram showing a typical CRT drive circuit.

FIG. 9 is a circuit diagram showing a typical CRT drive circuit. Referring to the same Figure, reference numeral 1 designates a video amplifier for amplifying a video signal, numeral 2 designates a cut-off circuit for adjusting the amplified video signal and supplying it to a cathode. Numeral 3 designates a fly-back transformer for supplying a high voltage to an anode and a focus voltage to a focus electrode, numeral 3a designates a primary winding of the fly-back transformer, numeral 3b designates a secondary winding of the fly-back transformer, numeral 4 designates a screen voltage generating circuit for supplying a screen voltage to a screen electrode, numeral 4a designates an operational amplifier, and numeral 4b designates a variable resistor for supplying a set voltage to the noninverting input side of the operational amplifier 4a. Numeral 5 designates a horizontal output element comprising transistors, numeral 6 designates a diode, numeral 7 designates a capacitor, numeral 8 designates a contrast/brightness variable resistor having a contrast variable resistor 8a and a brightness variable resistor 8b which are operated by users.

Next, the operation of the CRT drive circuit shown in FIG. 9 will be described. As shown in the same Figure, a video voltage amplified by the video amplifier 1 and then adjusted by the cut-off control circuit 2 is applied to the CRT cathode. A high voltage and a focus voltage are applied from the fly-back transformer 3 to the CRT anode and the focus electrode. Further, a screen voltage is applied from the screen voltage generating circuit 4 to the CRT screen electrode.

When a pulse is applied to the horizontal output element 5, a high voltage pulse is generated by means of the diode 6, the capacitor 7 and the primary winding of the fly-back transformer 3, so that the high voltage and the focus voltage are applied to the CRT anode and to the focus electrode by means of the fly-back transformer 3. A screen voltage is branched from the primary winding 3a of the fly-back transformer 3 through rectifying to be applied to the CRT screen electrode according to a set voltage applied to the operational amplifier 4a in the screen voltage generating circuit 4 by rectifying the aforementioned generated high voltage pulse.

Focus adjustment of the CRT is achieved by setting the screen voltage so that focus is optimal by preliminarily adjusting the variable resistor 4b and further adjusting focus so as to be optimal by adjusting the focus voltage. Further, the brightness of the CRT may be adjusted by adjusting the DC voltage by means of the contrast/brightness variable resistor for users and then supplying the DC voltage to the video amplifier 1 and the cut-off control circuit 2 respectively.

Meanwhile, this kind of the CRT drive circuit is used for CRTs having a plurality of resolutions. For example, as a CRT for a plurality of resolutions in accordance with the specification of mask pitch is used.

Generally, when the CRT drive circuit is applied to a CRT having a plurality of resolutions, if the screen voltage is set by giving preference to focus so that characters displayed on a display arc clear, raster moire may appear depending on resolution so that the display becomes unclear.

Conventionally, the variable resistor 4b has been preliminarily adjusted so as to keep the screen voltage always low in order to suppress influence of the screen due to such a resolution gained when the raster moire is generated. However, if such a constant low screen voltage is set, the focus deteriorates alone unnecessarily on screen with other resolutions in which no raster moire is present, so that displayed characters and the like blur.

To cope with raster moire which occurs under any resolution due to mask pitch as described above, conventionally it has been necessary to reduce the screen voltage with the sacrifice of focus. Thus, with conventional manner, there has been such a problem that focus may deteriorate on displays with other resolutions in which no raster moire is present.

SUMMARY OF THE INVENTION

An object of the present invention is to solve the aforementioned problem and provide a CRT drive circuit capable of avoiding unnecessary deterioration of focus by improving raster moire with preference when raster moire is present on a display screen or achieving focus with preference when no raster moire is present or only negligible moire is present.

To attain the aforementioned object, according to a first aspect of the present invention, there is provided a CRT drive circuit provided with a screen voltage control section for outputting a control voltage for adjusting the screen voltage output from the screen voltage generating circuit to a desired voltage between the screen voltage for best focus and optimal screen voltage for improvement of raster moire.

As stated above, the screen control section of the CRT drive circuit according to the first aspect of the present invention adjusts the screen voltage output from the screen voltage generating circuit by controlling the screen voltage switching means by a user when raster moire is noticeable on the CRT screen. Consequently, the screen voltage output from the screen voltage generating circuit is adjusted to a raster moire improvement preference value, so that the raster moire of the CRT screen is improved. When it is desirable to return the screen voltage to its original focus preference value, by controlling the screen voltage switching means by the user, the screen voltage is adjusted to the focus preference value, so that the original CRT screen is regained.

According to the second aspect of the present invention, there is provided a CRT drive circuit wherein the aforementioned screen voltage control section in the first aspect comprises a memory preliminarily storing data corresponding to a control voltage for outputting the screen voltage for the best focus from the screen voltage generating circuit, a central processing unit (CPU) for reading data from the memory and a D/A converter for D/A conversion of data output from the CPU and further the screen voltage switching means having a raster moire improving switch means to be operated when it is desirable to improve raster moire on the display screen and a data changing switch means for changing data read into the CPU after the operation of the switch means.

As stated above, according to the second aspect of the present invention, it is possible to change the screen voltage by operating the raster moire improving switch means when it is desirable to improve raster moire on the display screen displayed with preference of focus and then changing data read into the CPU by means of the data change-over switch means after the switch means is operated. Consequently, it is possible to select an optimal focus voltage and screen voltage corresponding to screens of various resolutions.

According to the third aspect of the present invention, there is provided a CRT drive circuit wherein the aforementioned data change-over switch in the second aspect thereof comprises a first data change-over switch means for gradually lowering the screen voltage by changing data read in the CPU and a second data change-over switch means for gradually raising the screen voltage.

As stated above, according to the third aspect of the present invention, in addition to the function of the second aspect, the screen voltage control section is capable of adjusting the screen voltage continuously between preference of focus and preference of raster moire improvement. Consequently, depending on the degree of the appearance of raster moire, any user can adjust continuously the screen voltage arbitrarily.

According to the fourth aspect of the present invention, there is provided a CRT drive circuit wherein the screen voltage control section in the first aspect comprises a first control voltage generating means for generating a control voltage for generating a screen voltage for optimal focus, a second control voltage generating means for generating a control voltage for generating a screen voltage for improving raster moire optimally, and a control voltage switching means for supplying either the output of the first control voltage generating means or the output of the second control voltage generating means to the screen voltage generating circuit in response to the operation of the screen voltage switching means.

As stated above, according to the fourth aspect of the present invention, the screen voltage control section of the first aspect supplies either the output of the first control voltage generating means or the output of the second control voltage generating means to the screen voltage generating circuit in response to the operation of the screen voltage change-over means by a user. Consequently, in addition to the effect of the first aspect, the screen voltage is adjusted to the optimal value of focus preference value or raster moire improvement preference value, thereby facilitating the operation thereof.

According to the fifth aspect of the present invention, there is provided a CRT drive circuit in which the screen voltage controlling section in the first aspect comprises a first control voltage generating means for generating control voltage for generating a screen voltage for optimal focus, a second control voltage generating means for generating a control voltage for generating screen voltage for improving raster moire optimally, and control voltage switching means for supplying an arbitrary voltage between the output of the first control voltage generating means and the output of the second control voltage generating means in response to the operation of the screen voltage switching means (11a) to the screen voltage generating circuit.

As stated above, according to the fifth aspect of the present invention, in response to the operation of the screen voltage change-over means by a user, an arbitrary voltage between the output of the first control voltage generating means and the second control voltage generating means is applied to the screen voltage generating circuit. Consequently, it is possible to realize the operation of the first aspect of the present invention more securely.

According to the sixth aspect of the present invention, in addition to the first aspect, there is provided a CRT drive circuit containing a variable resistor for adjusting, by a user, the amplification degree of the video amplifier and the cut-off voltage of the cut-off control circuit.

As stated above, the amplification degree of the video amplifier and the cut-off voltage of the cut-off control circuit are adjusted by means of a variable resistor in the sixth aspect to be adjusted by a user. Thus, although bright and cut-off voltage are changed when the screen voltage is changed to focus preference value or raster moire improvement preference value, it is possible to adjust the amplification degree and the cut-off voltage by an operation by a user.

According to the seventh aspect of the present invention, there is provided a CRT drive circuit wherein the variable resistor in the sixth aspect to be operated by a user is constructed so as to adjust the amplification degree of the video amplifier and the cut-off voltage of the cut-off control circuit to an optimal value of the screen voltage depending on the screen voltage adjustment state of the screen voltage control section.

As stated above, the variable resistor adjusted by a user in the seventh aspect functions, in addition to the function of the variable resistor adjusted by a user in the sixth aspect, to adjust the amplification degree of the video amplifier and the cut-off voltage of the cut-off control circuit to an optimal value of the screen voltage depending on the screen voltage adjustment state of the screen voltage control section. Accordingly, by adjusting the screen voltage by the user, the amplification factor and the cut-off voltage are automatically adjusted, so that the adjustment by the user becomes unnecessary.

According to the eighth aspect of the present invention, there is provided a CRT drive circuit wherein the screen voltage control section in the first aspect thereof is constructed so as to contain a memory unit preliminarily storing the relationship between the screen voltage inherent of a given CRT and the cut-off voltage and adjust the cut-off control circuit according to the cut-off voltage corresponding to the screen voltage by the operation of the user's switch.

As stated above, the screen voltage control section according to the eighth aspect of the present invention reads, when a user operates the switch, the cut-off voltage inherent of a given CRT corresponding to the screen voltage from a memory unit to adjust the cut-off control circuit according to the cut-off voltage. Thus, it is possible to adjust the cut-off control circuit very accurately. Additionally, the necessity of a user variable resistor and the necessity of the adjustment are eliminated.

The aforementioned and other objects and features of the present invention will be made further evident by reading the following description with reference to drawings. However, it should be known that the drawings are presented only for graphical representation, but not for restricting the limit of the present invention.

DETAILED DESCRIPTION OF THE PREFERRED EMBODIMENTS

Embodiment 1

Figure 1:
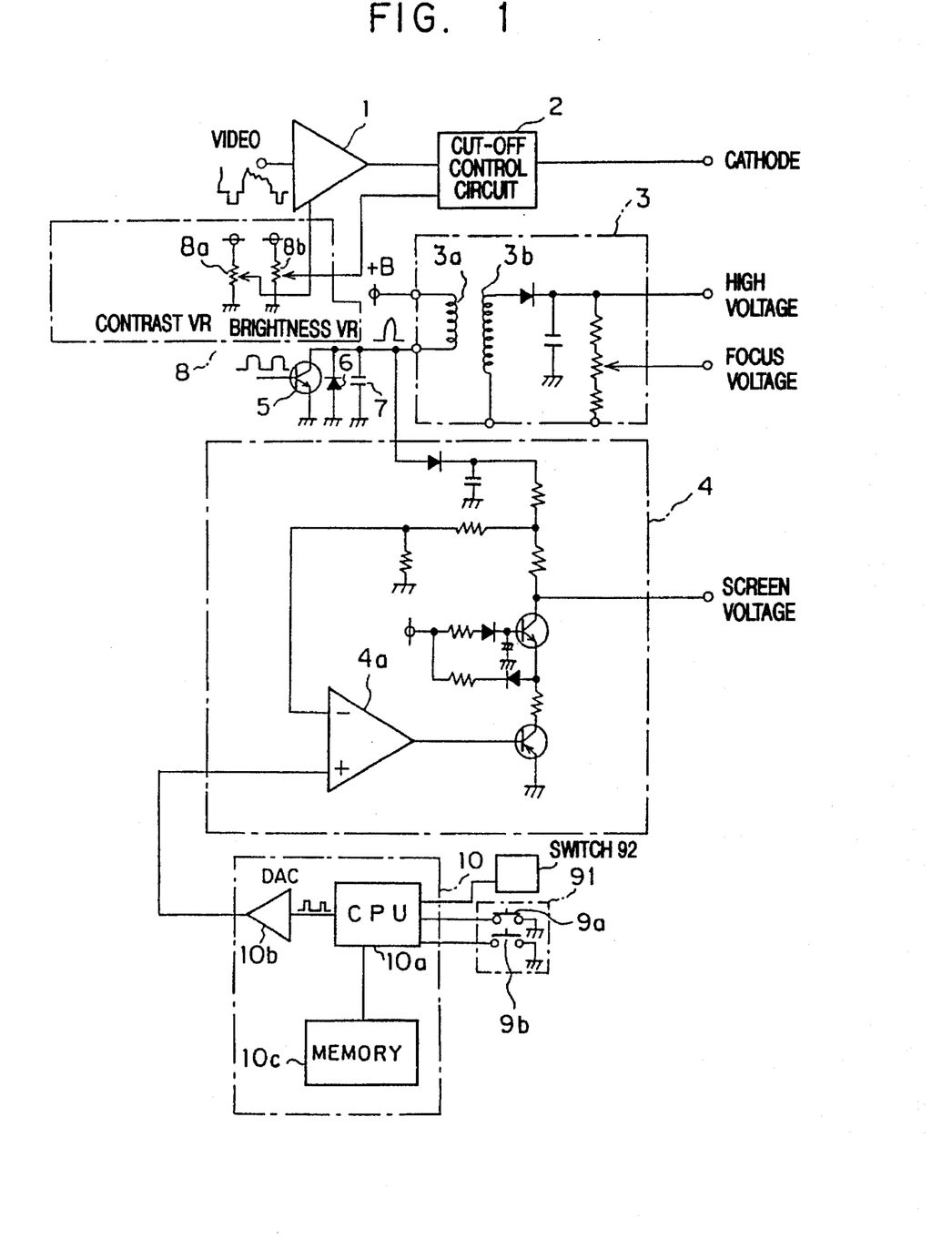
FIG. 1 is a circuit diagram showing a CRT drive circuit according to the embodiment 1 of the present invention.

In the following, an embodiment of the present invention will be described with reference to drawings. FIG. 1 is a circuit diagram showing a CRT drive circuit according to the first embodiment of the present invention. Referring to FIG. 1, reference numeral 1 designates a video amplifier for amplifying video signals, and numeral 2 designates a cut-off control circuit for adjusting the amplified video signal and supplying it to respective cathodes of the CRT. Numeral 3 designates a fly-back transformer for supplying a high voltage to an anode and a focus voltage to a focus electrode, numeral 4 designates a screen voltage generating circuit for supplying a screen voltage to a screen electrode, and numeral 4a designates an operational amplifier. Numeral 5 designates a horizontal output element comprising transistors, numeral 6 designates a diode, numeral 7 designates a capacitor and numeral 8 designates a contrast/brightness variable resistor having a contrast variable resistor 8a to be operated by user and a brightness variable resistor 8b. The elements mentioned above are the same as those of the typical circuit shown in FIG. 8. Numeral 91 designates a switch section comprising a plurality of switches to be operated by users, numeral 9a designates a screen voltage lowering switch contained in the switch section 91, numeral 9b designates a screen voltage raising switch contained in the switch section 91, numeral 92 designates a switch for displaying a screen voltage selecting menu on the CRT screen, and numeral 10 designates a screen voltage control section including a CPU 10a, a D/A converter 10b and a memory unit 10c.

Next, the operation of the CRT drive circuit shown in FIG. 1 will be described. The description about the operation for generation of a drive voltage to the CRT is omitted because it is the same as in typical technology and therefore the operation for improvement of raster moire will be described with reference to FIG. 2. In this embodiment, it is possible to achieve variable control of the screen voltage by means of the screen voltage control section comprising a microcomputer.

The memory unit 10c in the screen voltage control section 10 preliminarily stores data corresponding to the control voltage for generating a screen voltage for optimizing the focus of the CRT. Before the operation for improvement of raster moire is started, the CPU 10a in the screen voltage control section 10 reads data (control voltage for best focus) stored in the memory unit, the screen voltage is converted to a DC analog control voltage through the D/A converter 10b and applied to the noninverting input terminal of the operational amplifier in the screen voltage generating circuit 4 as a control voltage and then the focus of the CRT is maintained in the optimal condition.

Figure 2:
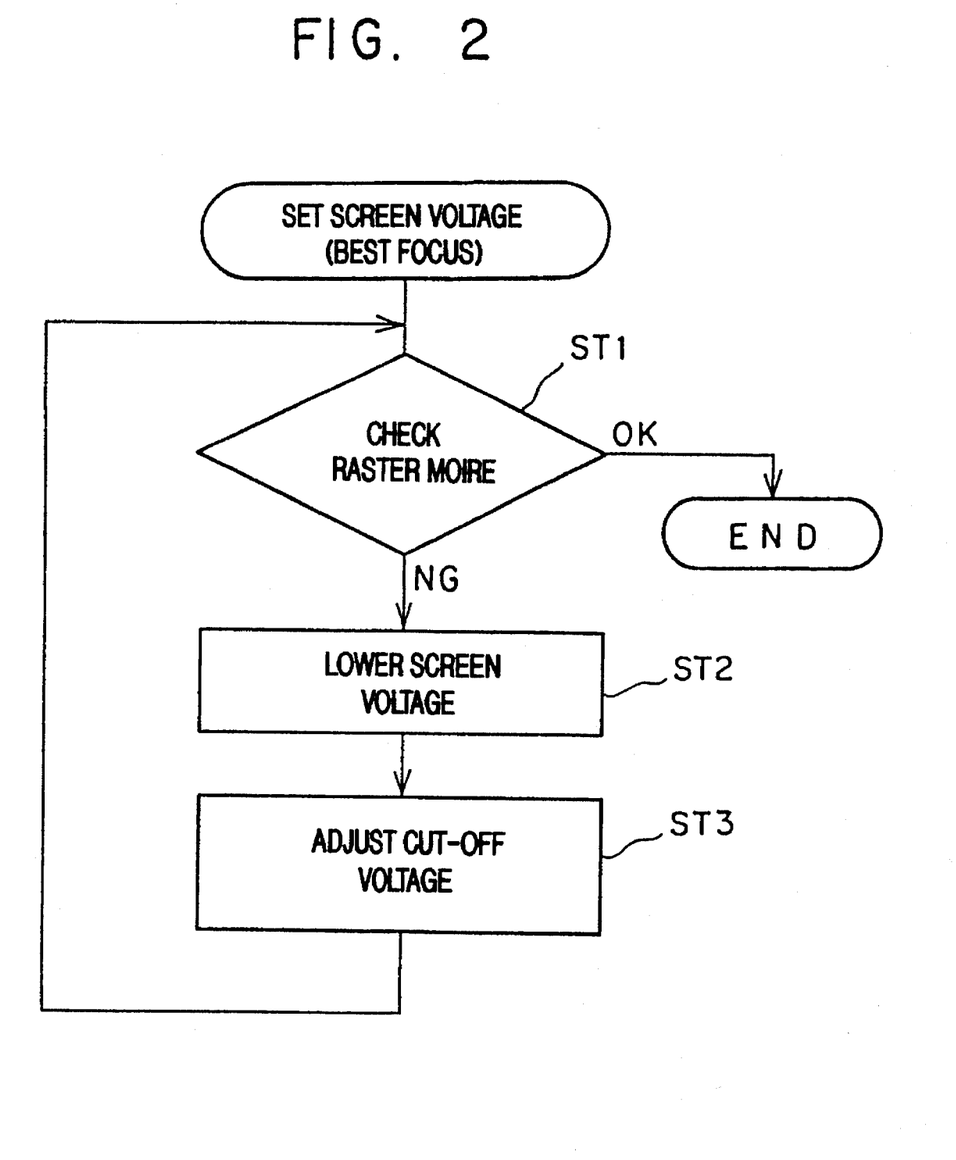
FIG. 2 is a flowchart showing the raster moire improvement operation of the embodiment 1.

With this condition, a user checks whether raster moire is present in a display screen (step ST1) and then when there is raster moire and when he requests to remove the raster moire, the user operates the switch 92 for displaying a menu in order to display the screen voltage selection menu on the screen. Next, the user operates the screen voltage lowering switch 9a to change data (voltage for best focus) in the screen voltage control section 10 gradually, thereby lowering the screen voltage gradually and then adjusting to such an optimal value that a best focus can be gained under the condition in which raster moire vanishes (step ST2). At this time, the CPU 10a changes data by sequentially counting down data of the screen voltage control section in response to the operation of the screen voltage lowering switch 9a.

On the other hand, when the screen voltage is changed, the brightness and the contrast change according to the characteristic of the CRT. Therefore, the user adjusts the DC voltage by means of the contrast variable resistor 8a and the brightness variable resistor 8b of the contrast/brightness variable resistor 8 for users and applies this DC voltage to the video amplifier 1 and the cut-off control circuit 2 respectively, thereby adjusting brightness and contrast (step ST3).

Consequently, when raster moire appears, any user can adjust the screen voltage as required so as to gain the best focus under the condition in which raster moire vanishes.

Meanwhile, when the user wants to return the CRT screen to preference of focus, he may operate the screen voltage raising switch 9b.

In the aforementioned embodiment, a case in which the screen voltage is changed gradually has been described, however, the present invention is not restricted to this case. For example, a focus preference value and a raster moire preference value may previously be stored in the memory unit. In this case, it is assumed that the switches 9a and 9b are a raster moire improvement preference switch and the focus preference switch respectively. When it is desirable to improve raster moire, the switch 9a is operated to lower the screen voltage to a certain specified value. When focus is given a preference, the switch 9b is operated.

Additionally, instead of the construction of the contrast/brightness variable resistor 8, it is permissible to construct the CRT drive circuit so as to control the CPU by adjusting the switch in the condition in which the switch, the CPU and the D/A converter are used to generate an appropriate DC voltage so as to control the video amplifier 1 and the cut-off control circuit 2.

In the aforementioned embodiment, the screen voltage is lowered to improve raster moire, however, it is permissible to raise the screen voltage in order to improve raster moire.

Embodiment 2

Figure 3:
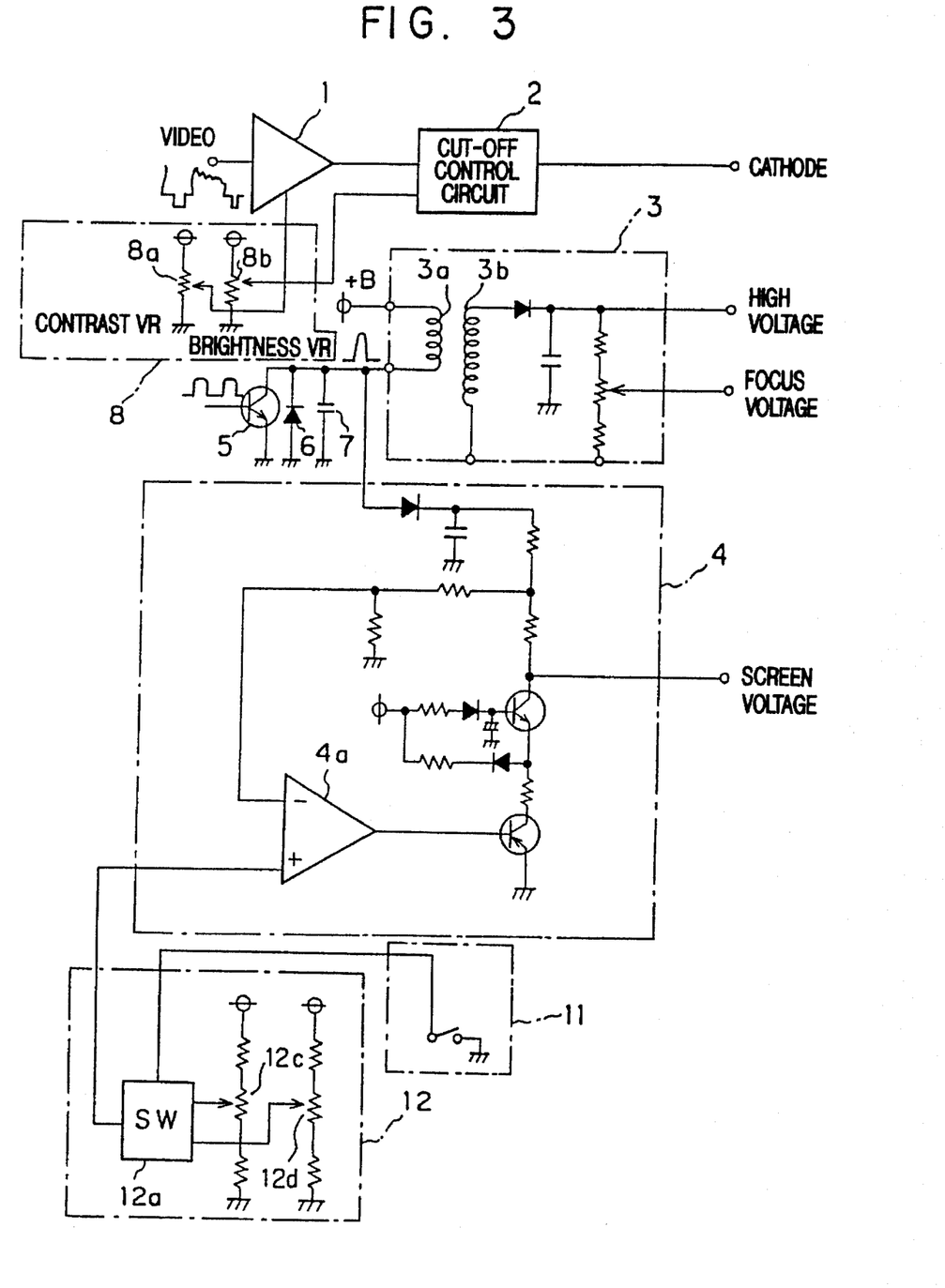
FIG. 3 is a circuit diagram showing a CRT drive circuit of the embodiment 2 of the present invention.

FIG. 3 is a circuit diagram showing a CRT drive circuit according to another embodiment of the present invention. Referring to the same Figure, reference numeral 11 designates a switch to be operated by a user, and numeral 12 designates a DC voltage switching section for controlling the screen voltage, the DC voltage switching section being switched by a change-over switch 12a which interlocks with the screen voltage change-over switch 11 and generating two optimal kinds of voltages, the screen voltage with preference given to focus of the CRT screen and the screen voltage with preference given to raster moire improvement thereof by means of variable resistors 12c and 12d. The explanation about the other construction is omitted because it is the same as that of the embodiment 1.

Next, the operation of the circuit shown in FIG. 3 will be described. The resistances of the variable resistors 12c and 12d are preliminarily set so as to generate two optimal kinds of voltages, namely the screen voltage of the CRT screen with preference given to focus and the screen voltage thereof with preference given to raster moire improvement. When the screen is displayed with preference given to focus while raster moire is present and when the user wants to remove the raster moire, the user operates the switch 11 to control the change-over switch 12a and consequently the change-over switch 12a changes a selected voltage from a control voltage for the screen voltage with preference given to focus to a control voltage for the screen voltage with preference given to raster moire improvement. At this time, because brightness and the like are changed due to the characteristic of the CRT when the screen voltage is changed, the user adjusts the DC voltage by means of the contrast variable resistor 8a and the bright variable resistor 8b of the contrast/brightness variable resistor 8 for users in order to supply this DC voltage to the video amplifier 1 and the cut,off control circuit 2 respectively, thereby adjusting brightness and the like.

Instead of the construction of the contrast/brightness variable resistor 8, it is permissible to use a switch the CPU, and a D/A converter for controlling the CPU by means of the switch to generate an appropriate DC voltage for controlling the video amplifier 1 and the cut-off control circuit 2.

Embodiment 3

In the above-described embodiment 2, although the adjustment of the screen voltage by operating the screen voltage change-over switch 11 for users is achieved so as to generate two optimal kinds of the screen voltages, namely the screen voltage with preference given to focus and the screen voltage with preference given to raster moire improvement, however, it is permissible to allow the control voltage of the screen voltage continuously to be variable by means of a variable resistor.

Figure 4:
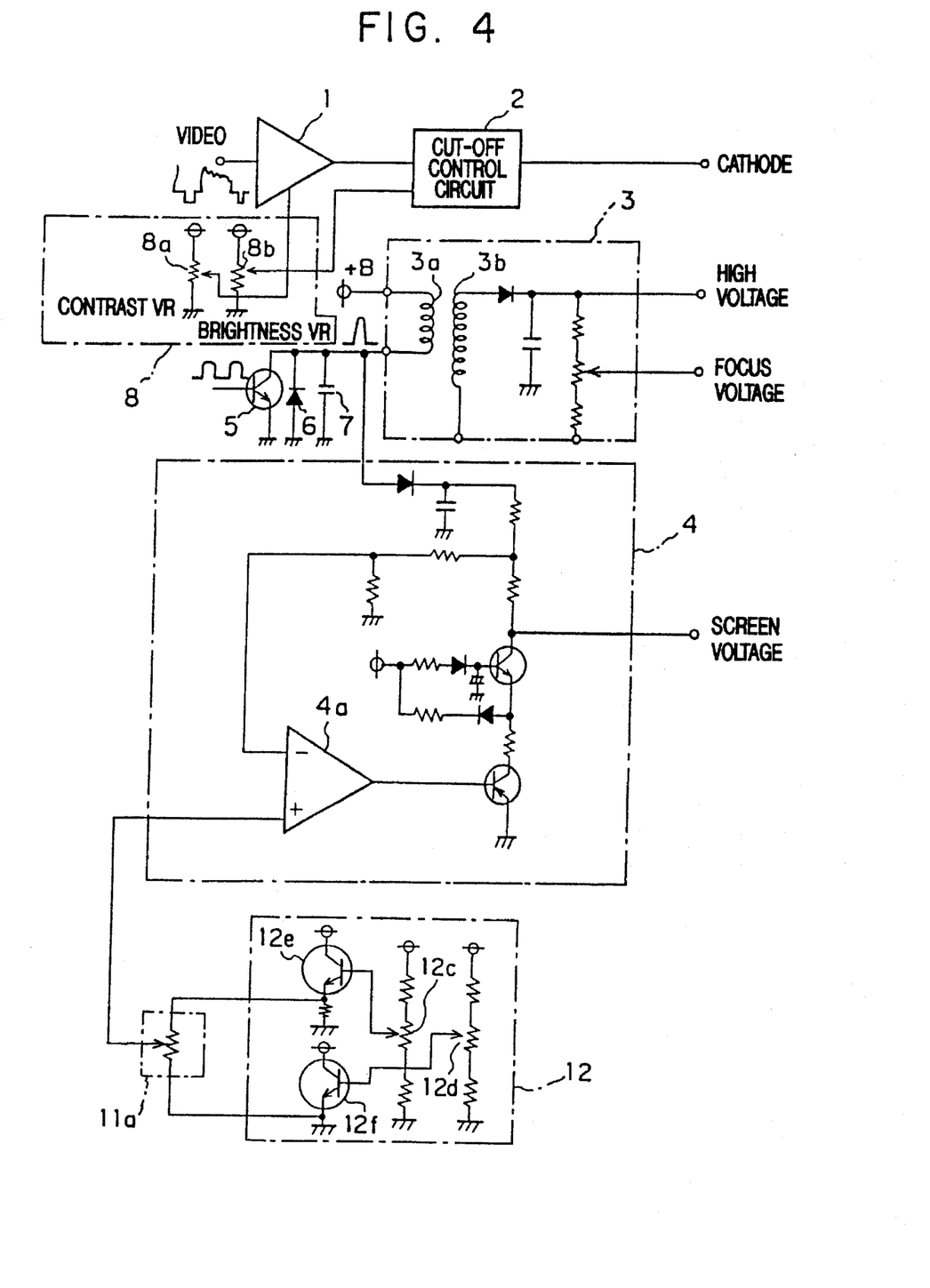
FIG. 4 is a circuit diagram showing a CRT drive circuit of the embodiment 3 of the present invention.

FIG. 4 is a circuit diagram showing a CRT drive circuit according to still another embodiment of the present invention in which the control voltage of the screen voltage is allowed to be continuously variable as mentioned above. Referring to the same Figure, reference numeral 11a designates a variable resistor to be operated by a user and numeral 12 designates a DC voltage switching section for controlling the screen voltage, the DC voltage switching section generating a difference of voltage between the screen voltage of the CRT screen with preference given to focus and the screen voltage thereof with preference given to raster moire improvement depending on a resistance of the variable resistor 11a which is changed by operating the variable resistor 11a and comprising a transistor 12e in which the control terminal of a variable resistor 12c is connected to its base and a transistor 12f in which the control terminal of a variable resistor 12d is connected to its base. Because the other construction is the same as in the embodiment 1, the description thereabout is omitted.

Next, the operation of the circuit shown in FIG. 4 will be explained. When a user wants to remove raster moire, the user controls the emitter voltage of the transistors 12e and 12f by operating the variable resistor 11a. Consequently, a difference of voltage between the control voltage corresponding to the screen voltage with preference given to focus and the control voltage corresponding to the screen voltage with preference given to raster moire improvement is input into the noninverting input terminal of the operational amplifier 4a. The user continuously operates the variable resistor 11a until raster moire vanishes. Because the other operation thereof is the same as the operation of the circuit shown in FIG. 3, the description thereabout is omitted.

Embodiment 4

Figure 5:
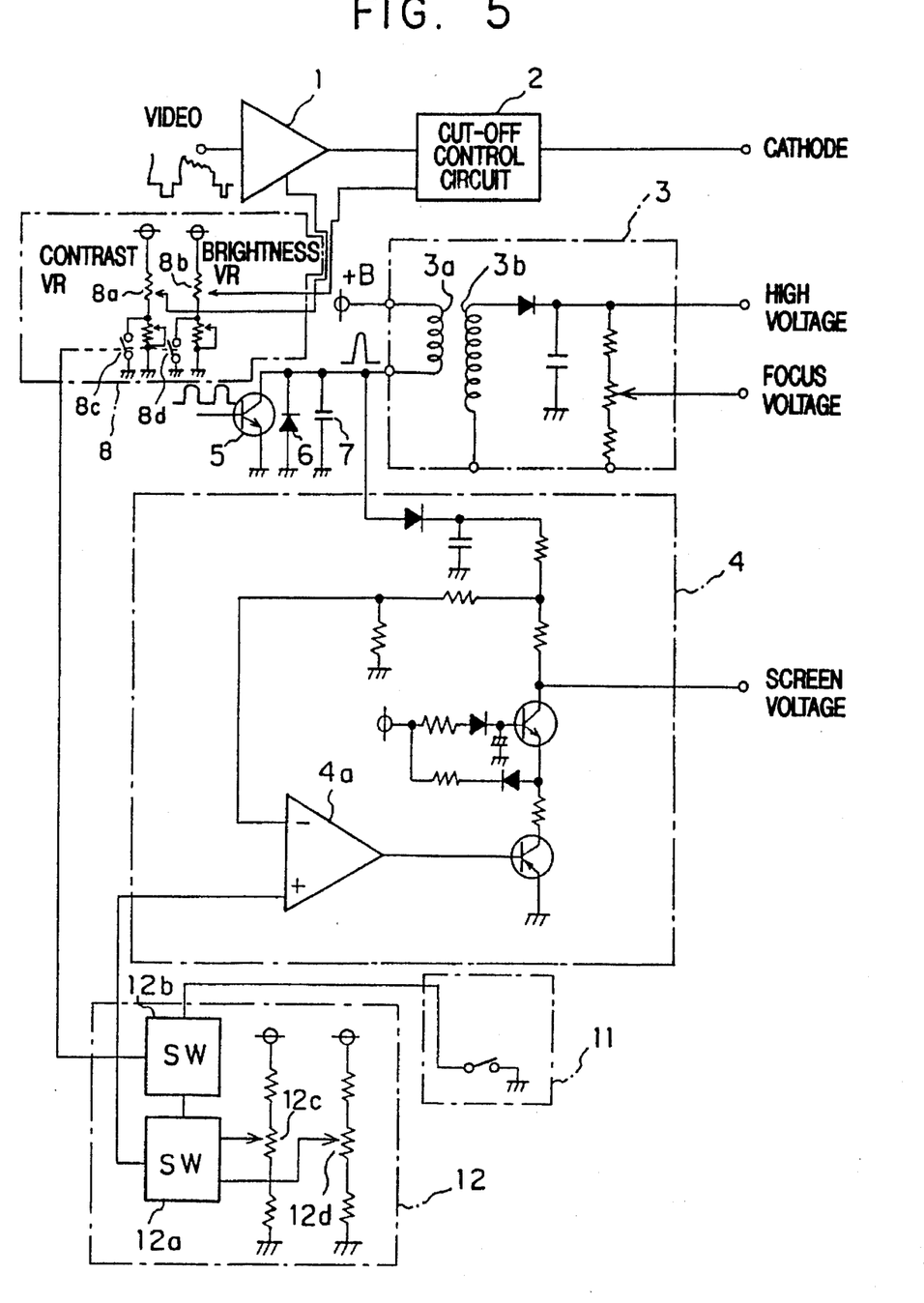
FIG. 5 is a circuit diagram showing a CRT drive circuit of the embodiment 4 of the present invention.

FIG. 5 is a circuit diagram showing a CRT drive circuit according to a further embodiment of the present invention.

Reference numerals 8c, 8d designate change-over switches for changing the position of the contrast/brightness variable resistor 8 depending on when preference is given to focus or when preference is given to raster moire improvement and numeral 12 designates a screen voltage control section for switching two optimal kinds of voltages, namely the control voltage corresponding to the screen voltage of the CRT screen with preference given to focus and the control voltage corresponding to the screen voltage thereof with preference given to raster moire improvement by adjusting the variable resistors 12c, 12d by means of the change-over switch 12a which interlocks with the screen voltage change-over switch 11 and further for operating the change-over switches 8c, 8d which changes the position of the aforementioned contrast/brightness variable resistor 8 by means of the change-over switch 12b. Because the other construction is the same as in the embodiment 2, the description thereabout is omitted.

The operation of the circuit shown in FIG. 5 will be described. The resistances of the variable resistors 12c and 12d are preliminarily set so as to generate two optimal kinds of voltages, namely the screen voltage of the CRT screen with preference given to focus and the screen voltage thereof with preference given to raster moire improvement. When a user wants to change from preference of focus to preference of raster moire improvement, the user operates the screen voltage change-over switch 11 to switch the change-over switches 12a, 12b. Switching the change-over switch 12a generates the voltage with preference given to raster moire as the screen voltage. When the change-over switch 12b is switched, the change-over switch 8c of the contrast/brightness variable resistor 8 is switched to supply the DC voltage gain when preference is given to raster moire improvement, to the video amplifier 1 and the cut-off control circuit 2 respectively, thereby adjusting brightness and the like. Meantime, when the user wants to change the CRT screen to a screen with preference given to focus, switching the screen voltage change-over switch 11 returns both focus and brightness to the state with preference given to focus.

When switching between preference of focus and preference of raster moire improvement is achieved by means of the change-over switch 12b and the change-over switches 8c, 8d, brightness is changed to appropriate brightness at the same time. Therefore, it is not necessary to adjust brightness each time by using the contrast/brightness variable resistor 8.

Meantime, according to the embodiment 3 also, it is possible to change the screen voltage continuously between the screen voltage with preference given to focus and the screen voltage with preference given to raster moire improvement by means of a similar variable resistor operable by a user to that shown in FIG. 4.

Embodiment 5

Figure 6:
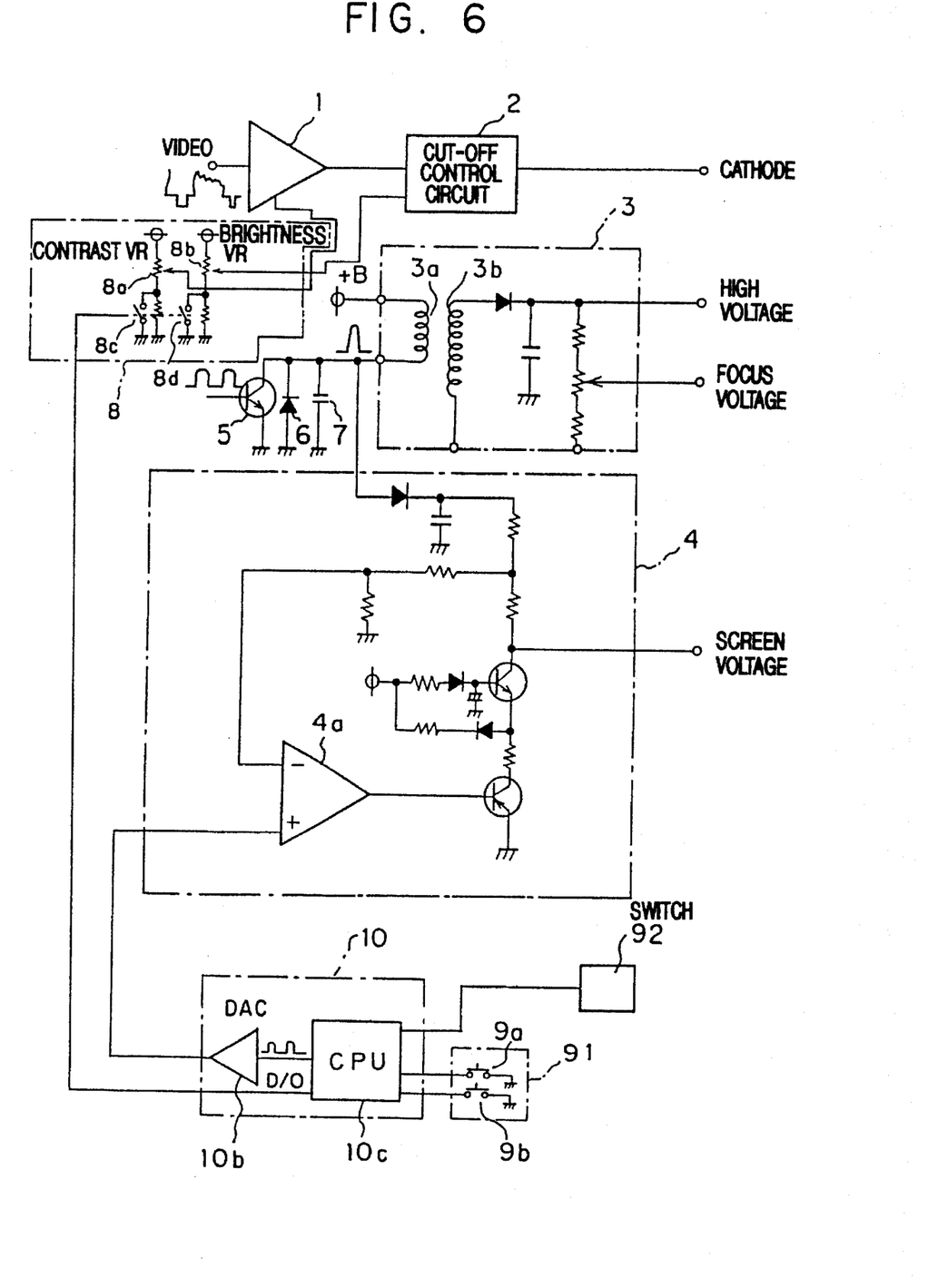
FIG. 6 is a circuit diagram showing a CRT drive circuit of the present invention.

FIG. 6 is a circuit diagram showing a CRT drive circuit according to still further embodiment of the present invention. Reference numeral 10c designates a CPU, which switches the change-over switches 8c, 8d of the contrast/brightness variable resistor 8 by changing the screen voltage change-over switch 91, thereby eliminating the necessity of adjustment of the contrast/brightness variable resistor 8 when switching between preference of focus and preference of raster moire improvement is performed. Because the other construction is the same as in the embodiment 1, the description thereabout is omitted.

The operation of the circuit shown in FIG. 6 will be described. Preliminarily data of optimal values about preference of focus of the CRT screen and preference of raster moire improvement thereof is stored in a memory (not shown) in the screen voltage control section 10. When a user selects preference of raster moire improvement by operating the screen voltage change-over switch 91, the CPU 10c reads data from the aforementioned memory and adjusts the screen voltage generating circuit 4 so as to produce the screen voltage capable of securing optimal focus in such a condition in which raster moire is improved. At the same time, the CPU 10c switches the change-over switches 8c, 8d in the contrast/brightness variable resistor 8 and supplies the DC voltage gained when preference is given to raster moire improvement to the video amplifier 1 and the cut-off control circuit 2 respectively, thereby adjusting brightness. Meantime, when the user wants to change the CRT screen to a screen with preference given to focus, operating the screen voltage change-over switch 91 returns both focus and brightness to the state with preference given to focus.

Embodiment 6

Figure 7:
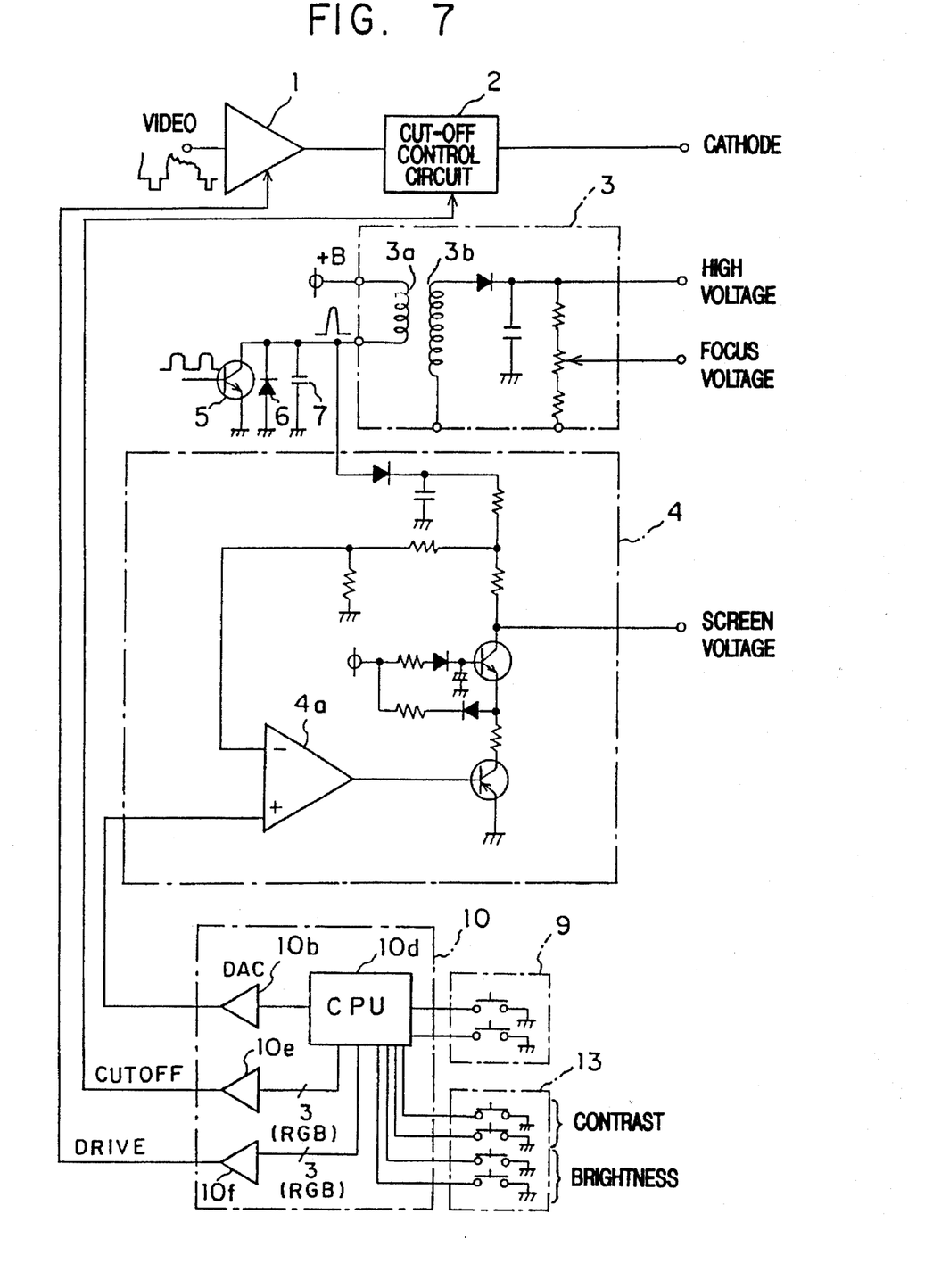
FIG. 7 is a circuit diagram showing a CRT drive circuit of the embodiment 6 of the present invention.

FIG. 7 is a circuit diagram of a CRT drive circuit according to yet still further embodiment of the present invention. Referring to the same Figure, reference numeral 10d designates a CPU, which switches the screen voltage to the optimal value of preference of focus or optimal value of preference of raster moire improvement depending on data stored in a memory (not shown) by changing the screen voltage change-over switch 91, supplies appropriate amplification degree and cut-off voltage to the video amplifier 1 and the cut-off control circuit 2 respectively according to a cut-off design diagram shown in FIG. 8 in order to adjust brightness and cut-off voltage, and further enables manual operation of brightness and cut-off voltage in response to the operation of the contrast/brightness switch 13 by the user. The cut-off voltage mentioned herein refers to a voltage gained between the grid and the cathode, which can be displayed on the screen. Because the other construction is the same as in the embodiment 1, the description thereabout is omitted.

Figure 8:
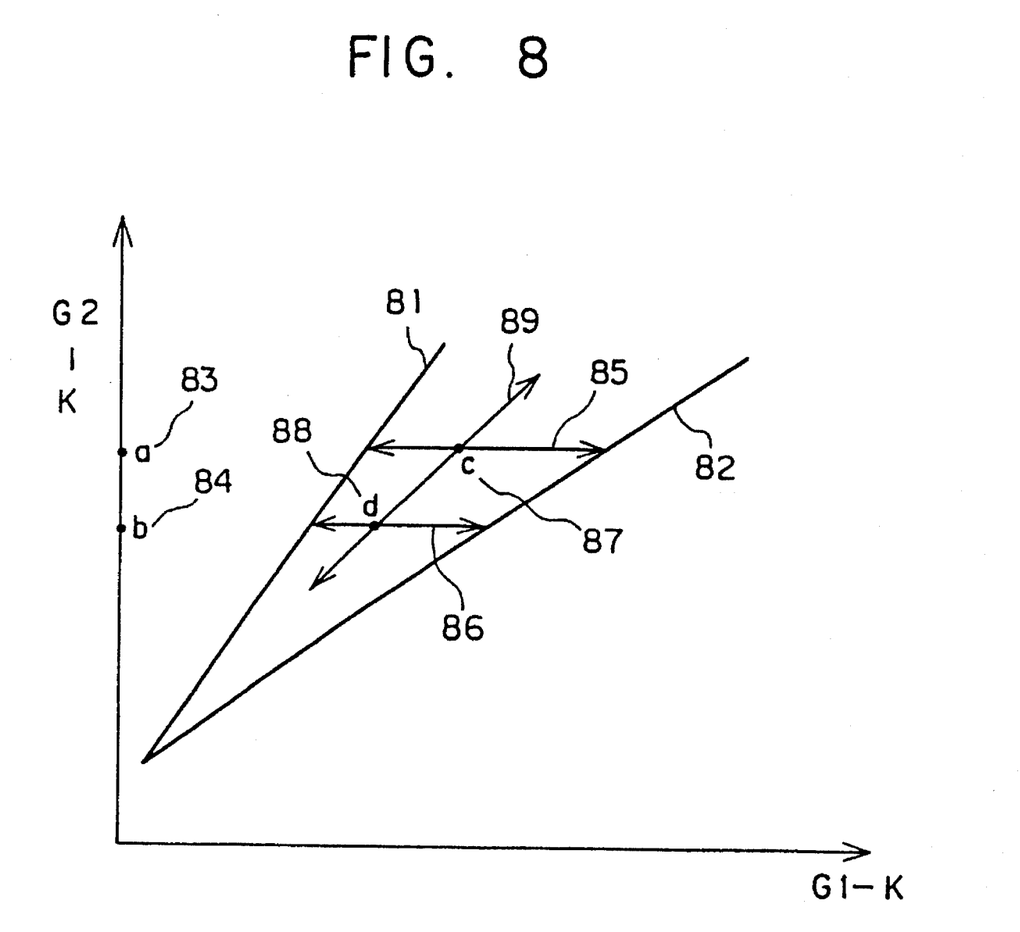
FIG. 8 is a characteristic diagram showing the relationship between the screen voltage of the CRT and the grid voltage thereof.

The operation of the circuit shown in FIG. 7 will be described with reference to FIG. 8. Referring to FIG. 8, reference numeral 81 designates maximum spot cut-off voltage, numeral 82 designates minimum spot cut-off voltage, numeral 83 designates screen voltage with preference given to focus, numeral 84 designates screen voltage with preference given to raster moire improvement, numeral 85 designates the deflection range of the cut-off voltage of the CRT gained when the screen voltage is "a", numeral 86 designates the deflection range of the cut-off voltage of the CRT gained when the screen voltage is "b", numeral 87 designates a certain cut-off voltage of the CRT when the screen voltage is "a", numeral 88 designates a cut-off voltage of the CRT when the screen voltage is "b", and numeral 89 designates a straight line indicating the relationship between the screen voltage of the CRT and the cut-off voltage thereof. Generally, there occurs deflection of the characteristic of the screen voltage and the grid voltage even in the same CRT unit as evident from the cut-off design diagram shown in FIG. 8. Namely, referring to FIG. 8, deflection may occur between the maximum spot cut-off voltage 81 and the minimum spot cut-off voltage 82 depending on the CRT. The memory of the screen voltage control section 10 stores data necessary for controlling a certain cut-off voltage 87 of the CRT gained when the screen voltage is screen voltage with preference given to focus 83 and the cut-off voltage 88 of the CRT gained when the screen voltage is screen voltage with preference given to raster moire improvement 84. Consequently, it is possible to adjust the cut-off control circuit 2 according to the relationship 89 between the screen voltage and the cut-off voltage of the aforementioned CRT shown in FIG. 8 when the screen voltage is changed by operating the screen voltage change-over switch 9 in the condition in which the relationship 89 between the screen voltage of the CRT and the cut-off voltage thereof is given to the CPU 10d, thereby eliminating the necessity of the contrast/brightness variable resistor 8 shown in the embodiments 1–4 and adjustment by means of the contrast/brightness variable resistor 8.

Because a change of brightness due to contrast is affected more or less when the spot cut-off voltage is changed, any user can adjust brightness by operating the contrast/brightness switch 13 for users. Further, it is permissible to control the video amplifier 1 by preliminarily storing control data relating to brightness like in the aforementioned cut-off control.

According to the first aspect of the present invention, as described above, the CRT drive circuit is constructed so as to contain a screen voltage control section for adjusting the screen voltage output from the screen voltage generating circuit to raster moire improvement preference value by operating the screen voltage change-over means by a user. Consequently, it is possible to return the CRT screen to its original CRT screen by changing the screen voltage in only screens having resolution necessitating the improvement of the raster moire of the CRT screen and adjusting the screen voltage to focus preference value in the other screens. As a result, there is such an effect that deterioration of focus due to improvement of raster moire can be minimized.

According to the second aspect of the present invention, it is possible to change the screen voltage by operating the raster moire improving switch means when it is desirable to improve raster moire on the display screen displayed with preference of focus and then changing data read into the CPU by means of the data change-over switch means after the switch means is operated. Consequently, it is possible to select an optimal focus voltage and screen voltage corresponding to a screen of various resolution.

According to the third aspect of the present invention, in addition to the effect of the second aspect, the screen voltage control section is capable of adjusting the screen voltage continuously between preference of focus and preference of raster moire improvement. Consequently, depending on the degree of the appearance of raster moire, any user can adjust continuously the screen voltage arbitrarily.

According to the fourth aspect of the present invention, the screen voltage control section of the first aspect supplies either the output of the first control voltage generating means or the output of the second control voltage generating means to the screen voltage generating circuit in response to the operation of the screen voltage change-over means by a user. Consequently, in addition to the effect of the first aspect, the screen voltage is adjusted to the optimal value of focus preference value or raster moire improvement preference value, thereby facilitating the operation thereof.

According to the fifth aspect of the present invention, in response to an operation of the screen voltage change-over means by a user, an arbitrary voltage between the output of the first control voltage generating means and the output of the second control voltage generating means is applied to the screen voltage generating circuit. Consequently, it is possible to realize the operation of the first aspect of the present invention more securely.

According to the sixth aspect of the present invention, in addition to the first aspect to the fifth aspect of the present invention, there is provided a variable resistor which a user operates in order to adjust the amplification degree of the video amplifier and the cut-off voltage of the cut-off control circuit. Consequently, in addition of the effects of the first aspect to the fifth aspect of the present invention, brightness and cut-off voltage after the screen voltage is changed can be adjusted by an operation by a user.

According to the seventh aspect of the present invention, the variable resistor in the sixth aspect thereof is constructed so as to adjust the amplification degree of the video amplifier and the cut-off voltage of the cut-off control circuit to an optimal value of the screen voltage depending on the screen voltage adjustment state of the screen voltage control section. Thus, in addition to the effect of the fourth aspect thereof, it is possible to automatically adjust the amplification degree and the cut-off voltage by an adjustment of the screen voltage by a user, so that the necessity of the adjustment of the variable resistor by the operation by the user is eliminated, thereby facilitating the operation of the variable resistor.

According to the eighth aspect of the present invention, the screen voltage control section in the first aspect thereof is constructed so as to contain a memory unit preliminarily storing the relationship between the screen voltage inherent to a given CRT and the cut-off voltage and adjust the cut-off control circuit according to the cut-off voltage corresponding to the screen voltage by the operation of the user's switch. Thus, it is possible to adjust the cut-off control circuit after the screen voltage is changed additionally, the necessity of the variable resistor to be operated by a user is eliminated and the necessity of the adjustment is also eliminated, thereby simplifying the construction of the present invention and facilitating the operation thereof.

What is claimed is:

1. A CRT drive circuit comprising:
   a cut-off control circuit for adjusting a video signal amplified by means of a video amplifier and supplying the amplified video signal to respective cathodes of a CRT;
   a fly-back transformer for supplying a high voltage to an anode of said CRT and supplying a focus voltage to a focus electrode;
   a screen voltage generating circuit for supplying screen voltage to a screen electrode of said CRT;
   a screen voltage switching means to be operated by a user; and
   a screen voltage control section for outputting a control voltage for adjusting the screen voltage output from said screen voltage generating circuit in response to the operation of said screen voltage switching means to a desired voltage, the desired voltage being one of a screen voltage for optimal focus when raster moire is negligible or absent and a screen voltage for optimal raster moire improvement when raster moire is present.

2. A CRT drive circuit according to claim 1, wherein said screen voltage control section comprises a memory for preliminarily storing data corresponding to a control voltage for outputting the screen voltage for optimal focus from said screen voltage generating circuit, a central processing unit for reading said data from said memory, and a D/A converter for achieving D/A conversion of data output from said central processing unit, and said screen voltage switching means comprises a raster moire improving switch means to be operated when it is desirable to improve the raster moire in a display screen and data change-over switch means for changing data read in said central processing unit after said switch means is operated.

3. A CRT drive circuit according to claim 2, wherein said data change-over switch means comprises a first data change-over switch means for gradually lowering said screen voltage by changing data read in said central processing unit and a second data change-over switch for gradually raising said screen voltage.

4. A CRT drive circuit according to claim 1, wherein said screen voltage control section comprises a first control voltage generating means for generating a second voltage for generating a screen voltage for optimal focus, a second control voltage generating means for generating a screen voltage for improving raster moire optimally and a control voltage switch means for supplying, in response to the operation of said screen voltage switching means, either the output of said first control voltage generating means or the output of said second control voltage generating means to said screen voltage generating circuit.

5. A CRT drive circuit according to claim 1, wherein said screen voltage control section comprises a first control voltage generating means for generating a control voltage for generating a screen voltage for optimal focus, a second control voltage generating means for generating a control voltage for generating a screen voltage for improving raster moire optimally, and control voltage switching means for supplying, in response to the operation of said screen voltage switching means, an arbitrary voltage between the output of said first control voltage generating means and the output of said second control voltage generating means to said screen voltage generating circuit.

6. A CRT drive circuit according to any one of claims 1 to 5, further comprising a variable resistor to be operated by a user for adjusting the amplification degree of said video amplifier and the cut-off voltage of said cut-off control circuit.

7. A CRT drive circuit according to claim 6, wherein said variable resistor to be operated by a user adjusts the amplification degree of said video amplifier and the cut-off voltage of said cut-off control circuit to an optimal value each corresponding to the screen voltage adjustment state of said screen voltage control section.

8. A CRT drive circuit according to claim 1, wherein said screen voltage control section comprises a memory unit preliminarily storing a relationship value between the screen voltage inherent of a CRT and the cut-off voltage, and adjusts the cut-off control circuit according to a cut-off voltage corresponding to the screen voltage generated in response to the operation of a switch by a user.

* * * * *